Sept. 27, 1927.

E. HIBBERT

TIRE FOR MOTOR VEHICLES AND THE LIKE AND
METHOD OF MANUFACTURING SAME

Filed Sept. 19, 1924

1,643,848

Inventor
Ernest Hibbert
By B. Singer Atty.

Patented Sept. 27, 1927.

1,643,848

UNITED STATES PATENT OFFICE.

ERNEST HIBBERT, OF GOULBURN, NEW SOUTH WALES, AUSTRALIA.

TIRE FOR MOTOR VEHICLES AND THE LIKE AND METHOD OF MANUFACTURING SAME.

Application filed September 19, 1924, Serial No. 738,629, and in New Zealand April 16, 1924.

This invention relates to resilient tires for motor and other vehicles and has for its obects to provide a tire which will eliminate the usual inner pneumatic tube while retaining the necessary resilience of the tire.

By this invention the cost of manufacture is reduced and the tire is to all intents and purposes puncture proof. Furthermore such a tire is practically unburstable, and there is a minimum of air or rubber friction, the only portion of the tire subjected to friction being the outer tire against the surface of the road. It will thus be seen that blow-outs are a practical impossibility thus preventing loss of life, and equipped with tires made according to this invention a car does not need to carry spare tires or tubes, and so far as the tires are concerned, there is every reasonable prospect of the car reaching its destination without any stoppages.

The invention consists essentially of a method of manufacturing a tire inner core by winding successively a plurality of cell bands longitudinally of a wheel rim and filling the interstices with a thick rubber solution and vulcanizing the same.

In a modification the invention contemplates the provision of a similar tire but the semi-vulcanized cell bands have interposed between them semi-vulcanized bands having on each side hemispherical cavities adapted to receive the respective halves of the air cavities in said first mentioned bands, the whole being built up to form a core which is vulcanized and securable to the outer cover. Any cavities left after completion of the core may be filled up with vulcanized rubber or the like material.

The invention consists in these features, in the special method of construction of the tire hereinafter referred to, and in the features and arrangements and combination of parts hereinafter described and more particularly pointed out in the claim.

Figure 1:
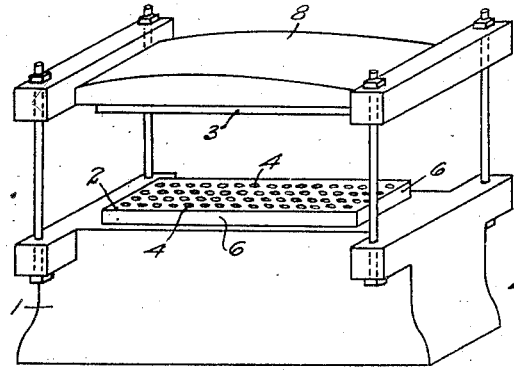
Figure 2:
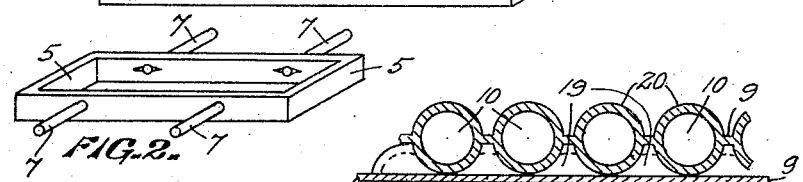
Figure 3:
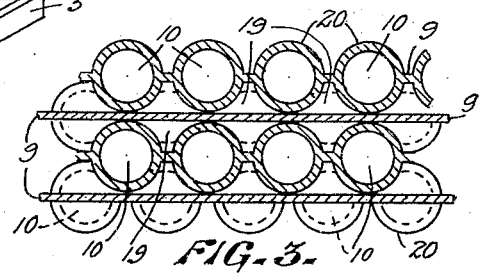
Figure 4:
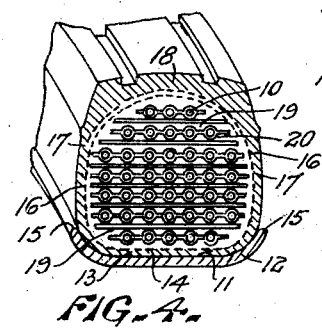
Figure 6:
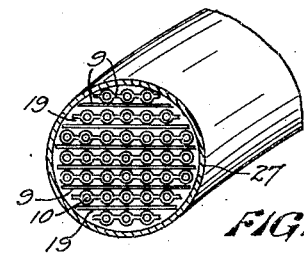
Figure 5:
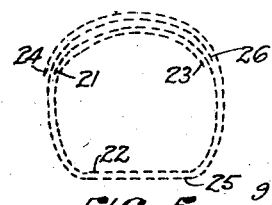
Figure 7:
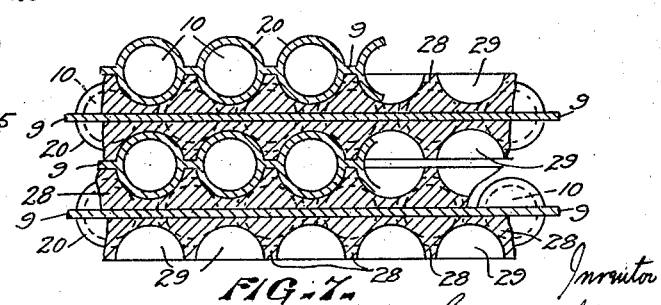

Referring now to the drawings which illustrate a constructional embodiment of the invention. Figure 1 is a perspective view of a specially designed vulcanizing press suitable for use in the manufacture of the cell bands having the spherical air cavities therein and which bound together in the form of a core comprise the inner portion of the improved tire. Figure 2 is a perspective view of the compressed air feeder frame which is used in conjunction with said press, Figure 3 is a cross sectional view of several cell bands or strips showing the method of building up the core of the tire, the spherical cavities in each row being in staggered relationship with the upper and lower rows, Figure 4 is a cross sectional elevation of the finished tire, Figure 5 is a diagrammatic view of a modification showing the method of lapping the fabric strips when two thicknesses of fabric are used. Figure 6 is a further modification showing a modified core for use with the outer cover, Figure 7 is an enlarged sectional view shewing a modification wherein a semi-vulcanized rubber webbing having hemispherical depressions is inserted between adjacent layers of air filled cavities.

Referring to Figure 1, which as stated before illustrates a convenient type of press wherein the spherical cell bands may be manufactured, the press 1 is provided with upper 3 and lower 2 steel faces which are provided with numerous hemi-spherical cavities coinciding with one another when the press is closed to form spherical cavities. Upon the face 2 is laid a flat strip of preferably raw sheet rubber. Any rubber composition which is recognized as being a satisfactory substitute for the purposes of raw rubber may be employed, preferably approximately $\frac{1}{16}$ inch thick and to the under side of the face 3 a second similar flat strip of raw rubber is secured by a suitable solution which will hold it temporarily in position. A compressed air feeder frame 5 which comprises a hollow rectangular frame is then placed over the lower face 2 fitting closely into the sides 6 thereof. The two faces 2 and 3 are then brought together and compressed air is admitted from any suitable source of supply through suitably located air inlet pipes 7 between the two flat strips of rubber. When the operator is satisfied that the air under pressure has penetrated the whole surface of the flat sheets and forced the adjacent rubber into the hemi-spherical cavities thereof, the faces 2 and 3 are brought tightly together and the required pressure of steam is applied to a steam head 8 in any usual way to semi-vulcanize the rubber strips.

When taken from the press the resultant semi-vulcanized band 9 contains a plurality of spherical cavities 10 filled with compressed air (hereinafter referred to as "cell bands").

To form the core of the tire, the inside 11 of the rim 12 is given a coat or cover of unvulcanized vulcanite of about ⅛ inch thickness to form a rubber foundation 13, upon which are laid transverse strips of fabric 14 which are preferably about 8 inches wide by 18 inches long for the usual type of tire. The ends 16 thereof are allowed to hang over the edges 15 of the wheel rim 12. A strip of the semi-vulcanized cell band 9 is then wound longitudinally and entirely around the rim 12 over the fabric 14 to form a complete circle. A second strip of cell band 9 is then wound concentrically over the first and in such a manner that the spherical portions of the second layer rest between the spherical portions of the first strip in staggered relationship. The strips being concentrically disposed, this operation is repeated until the required size of core is obtained. The ends 16 of the fabric 14 are then lapped over the core as shown in Figure 4, the outer rubber casing 17 and tread 18 are bound into position, and the whole tire is placed in a mould and suitably vulcanized. During the process of building up the core the interstices or spaces 19 between the outer faces 20 of the cells 10 are filled with a suitable thick solution so that when the tire is finally vulcanized, the whole forms a compact rubber tire containing a multiplicity of spherical cavities filled with compressed air.

In Figure 5 is shown the method of lapping when two thicknesses of fabric are used, the end 21 of the inner layer 22 being lapped over the end 23 while the end 24 of the outer layer 25 is lapped over the end 26, thus forming four thicknesses upon the outer circumference of the core. The fabric is well solutioned before being lapped.

A modification is shown in Figure 6 wherein the cell bands 9 are built up to form a core circular in cross section for use with an outer cover. The core is finished smooth upon the outer surface by a thin covering of rubber 27 made by contact with hot core moulds made of steel to the required shape.

Referring to the modification shown in Figure 7 bands of semi-vulcanized rubber webbing having hemispherical cavities 29 on each side are interposed between each cell band 9 the respective halves of the cells 10 each fitting into the adjacent depressions 29 in the adjacent rubber webbing 28. The said bands are built up to form a core the top and bottom webbing bands 28 having no depressions on the upper surfaces to give a better gripping surface. No solution other than is necessary to give the cavity bands a holding surface need generally be used. The method of attachment is essentially the same as that hereinbefore described with reference to the cell bands.

I claim.

The method of manufacturing a tire for motor vehicles and the like consisting in coating the inside of a wheel rim with unvulcanized vulcanite to form a foundation, laying transverse strips of fabric thereon, and allowing the ends of said strips to lap over the edges of the rim, winding a strip of semi-vulcanized cell band over the fabric longitudinally of the wheel rim to form a complete circle, winding second and subsequent strips of cell bands also longitudinally of the wheel rim and one upon another concentrically and arranging the same so that the air cells are disposed in staggered relationship in each band with respect to the adjacent bands until the required size of core is obtained, filling any interstices in the core with a thick solution, folding the ends of the fabric over such wound cell bands, binding the outer rubber casing and tread in position and then placing the whole tire in a mould and vulcanizing same.

In testimony whereof I have signed my name to this specification.

ERNEST HIBBERT.